(12) United States Patent
Raju et al.

(10) Patent No.: US 8,693,561 B2
(45) Date of Patent: Apr. 8, 2014

(54) RECEIVE SIGNAL DETECTION OF MULTI-CARRIER SIGNALS

(75) Inventors: Meesaraganda Surendra Raju, Bangalore (IN); Mohan Karnam, Banglore (IN); Sujai Chari, Burlingame, CA (US)

(73) Assignee: Posedge Inc., Sunnyvale, CA (US)

(*) Notice: Subject to any disclaimer, the term of this patent is extended or adjusted under 35 U.S.C. 154(b) by 112 days.

(21) Appl. No.: 13/423,113

(22) Filed: Mar. 16, 2012

(65) Prior Publication Data

US 2013/0243062 A1 Sep. 19, 2013

(51) Int. Cl.
H04K 1/10 (2006.01)
H04L 27/28 (2006.01)

(52) U.S. Cl.
USPC .......................................... 375/260; 375/259

(58) Field of Classification Search
USPC ....................................................... 375/260
See application file for complete search history.

(56) References Cited

U.S. PATENT DOCUMENTS

| 6,791,964 | B1 | 9/2004 | Hwang et al. |
| 7,539,123 | B2 * | 5/2009 | Rhodes ......................... 370/208 |
| 7,650,129 | B2 | 1/2010 | Baltus et al. |
| 7,864,884 | B2 | 1/2011 | Jansen |
| 8,391,400 | B2 * | 3/2013 | Zhang et al. ................... 375/295 |
| 2003/0002471 | A1 * | 1/2003 | Crawford et al. .............. 370/343 |
| 2005/0152314 | A1 * | 7/2005 | Sun et al. ....................... 370/334 |
| 2006/0083157 | A1 * | 4/2006 | Cheng et al. ................... 370/208 |
| 2007/0147322 | A1 * | 6/2007 | Agrawal et al. ................ 370/338 |
| 2007/0254594 | A1 | 11/2007 | Jansen |
| 2007/0263712 | A1 * | 11/2007 | Ling et al. ...................... 375/227 |
| 2009/0034407 | A1 * | 2/2009 | Lindh ............................ 370/210 |
| 2010/0226416 | A1 * | 9/2010 | Dent et al. ..................... 375/219 |
| 2010/0329393 | A1 | 12/2010 | Higuchi |
| 2011/0014919 | A1 * | 1/2011 | Otte et al. ...................... 455/442 |
| 2011/0033000 | A1 * | 2/2011 | Berens et al. .................. 375/260 |
| 2012/0243596 | A1 * | 9/2012 | Lovell ........................... 375/229 |
| 2013/0201850 | A1 * | 8/2013 | Swaminathan et al. ....... 370/252 |

* cited by examiner

*Primary Examiner* — Erin File
(74) *Attorney, Agent, or Firm* — Brian R. Short (57) ABSTRACT

Apparatuses, methods and systems of receive signal detection of a multi-carrier signal are disclosed. One method includes receiving a multi-carrier signal, determining a characteristic of each sub-carrier of the multi-carrier signal, and selecting a one of a plurality of receive signal detection techniques for each sub-carrier of the multi-carrier signal based on the determined characteristic of the sub-carrier.

25 Claims, 7 Drawing Sheets

RECEIVE SIGNAL DETECTION OF MULTI-CARRIER SIGNALS

FIELD OF THE DESCRIBED EMBODIMENTS

The described embodiments relate generally to wireless communications. More particularly, the described embodiments relate to systems, methods and apparatuses for receive signal detection of multi-carrier signals.

BACKGROUND

Multiple Input Multiple Output (MIMO) wireless systems offer merits of combating fading through Diversity, as well as enhance capacity (Spatial Multiplexing) as compared to Single Input Single Output (SISO) systems. Receive signal MIMO detection is a process of determining transmitted symbols sent (transmitted) from different transmit antennas. The receive detection involves separating each of the transmitted data stream optimally from the rest.

An optimal receiver detection scheme is the Maximum Likelihood (ML) scheme (if the noise is AWGN—additive white Gaussian noise), which computes the Euclidean distance between the received signal vector and product of all possible transmitted vectors with an estimated Channel Matrix, H. The complexity of this method however, increases exponentially with modulation order and the number of transmit antennas, making it particularly complex when utilized with MIMO systems.

Existing solutions involve using either a complete implementation of the ML scheme, which results in exponential increase in complexity or implementation of sub-optimal techniques, such as (but not limited to) Zero-Forcing, MMSE (minimum mean square error), Sphere Decoding, QRM, thereby trading performance with complexity. Some receive detection techniques such as Zero-Forcing and MMSE limit the Diversity advantage, though, they are the simplest in terms of implementation complexity.

It is desirable to have apparatuses and methods for receiver signal detection that provide the performance of Maximum Likelihood (ML) receive signal detection but does not require the complexity, particularly when used in MIMO systems.

SUMMARY

An embodiment includes a receiver. The receiver includes a plurality of receive chains operable to receive at least one multi-carrier signal, and a processor. For this embodiment, the processor is configured to determine a characteristic of each sub-carrier of the at least one multi-carrier signal, and select a one of a plurality of receive signal detection techniques for each sub-carrier of the at least one multi-carrier signal based on the determined characteristic of the sub-carrier.

Another embodiment includes a method of receive signal detection of a multi-carrier signal. The method includes receiving the multi-carrier signal, determining a characteristic of each sub-carrier of the multi-carrier signal, and selecting a one of a plurality of receive signal detection techniques for each sub-carrier of the multi-carrier signal based on the determined characteristic of the sub-carrier.

Another embodiment includes a wireless system. The wireless system includes a transmitter. The transmitter includes at least one transmit chain that transmits at least one multi-carrier signal. The transmitter further includes a transmit processor, wherein the transmit processor is operative to estimate a channel matrix of a transmission channel between the at least one transmitter chain and a plurality of receive chains. The wireless system further includes a receiver. The receiver includes the plurality of receive chains that are operable to receive the at least one multi-carrier signal and the channel matrix from the transmitter. The receiver further includes a receiver processor that is configured to determine a characteristic of each sub-carrier of the at least one multi-carrier signal wherein the determined characteristic for each sub-carrier comprises an orthogonality of channel elements of the channel matrix that correspond with the sub-carrier, and select a one of a plurality of receive signal detection techniques for each sub-carrier of the at least one multi-carrier signal based on the determined characteristic of the sub-carrier.

Other aspects and advantages of the described embodiments will become apparent from the following detailed description, taken in conjunction with the accompanying drawings, illustrating by way of example the principles of the described embodiments.

DETAILED DESCRIPTION

The embodiments described include methods and apparatuses for receive signal detection of a multi-carrier signals. The described embodiments provide low-complexity detection while sacrificing only minimal performance from the most complex receive detection schemes. The described embodiments are particularly useful in Multiple Input Multiple Output (MIMO) wireless systems, and provide a low complexity implementation for MIMO detection without sacrificing on performance. Additionally, the described embodiments can reduce overall round-trip time (RTT) delay in the transmission owing to reduced detection latency, which can improve throughput.

Figure 1:
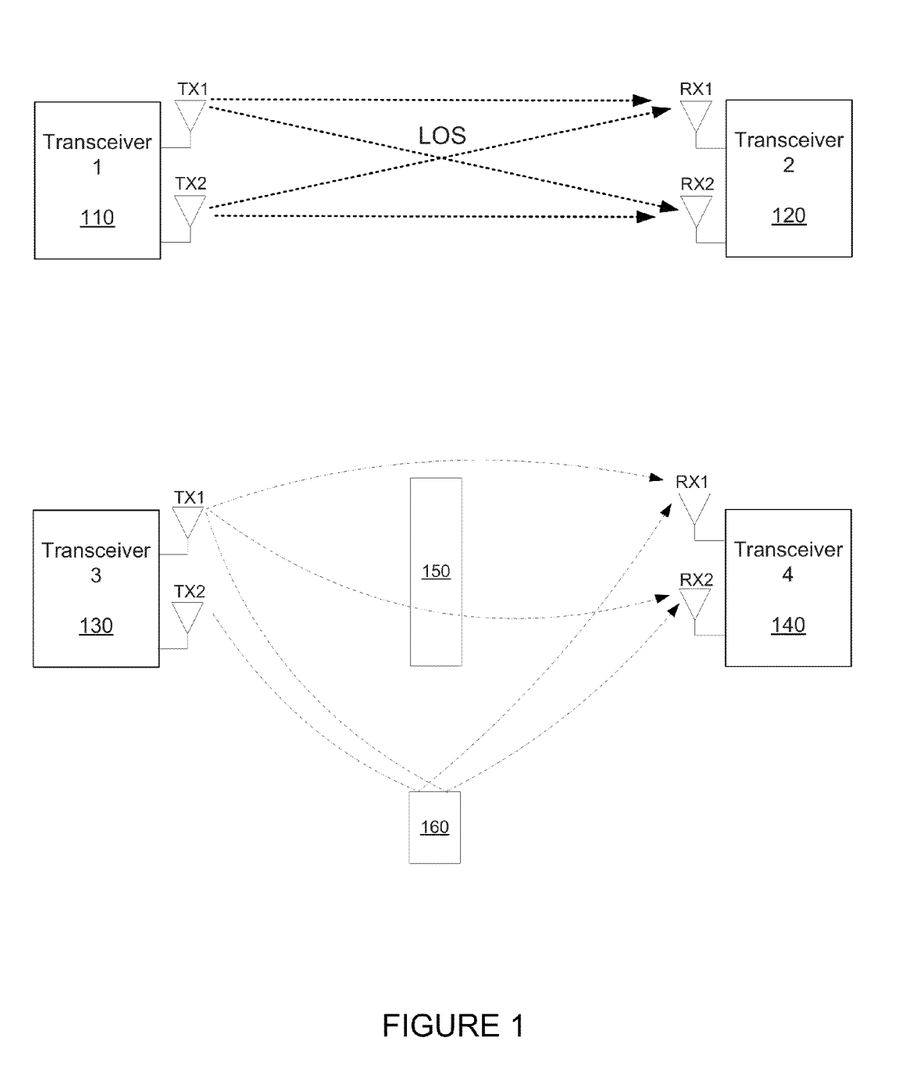
FIG. 1 shows an example a pair of transceivers that have a line-of-sight (LOS) wireless link, and a pair of transceivers that have a multiple path wireless link.

FIG. 1 shows an example a pair of transceivers that have a line-of-sight (LOS) wireless link, and a pair of transceivers that have a multiple path wireless link. Each of the transceivers 110, 120 or the first pair of transceivers include two antennas. As shown, the wireless link between the first transceiver 110 and the second transceiver 120 includes a line-of-sight (LOS) path. That is, the signals transmitted from the TX1, TX2 antennas of the first transceiver 110 have a clear, uninterrupted trip to the RX1, RX2 antennas of the second transceiver 120. There are no reflections or multi-paths of the transmission signal, and therefore, have a high likelihood of non-orthogonal channels.

In contrast, the wireless link between the third transceiver 130 and the fourth transceiver 140 does not include a line-of-sight (LOS) path. The paths between the antennas TX1, TX2 or the third transceiver 130 and the antennas RX1, RX2 of the fourth transceiver include reflections and multi-path. As a result, the channels between the third transceiver 130 and the fourth transceiver are more likely to include orthogonal channels. If the transmission signal is a multi-carrier signal, such as, an orthogonal frequency division multiplexed (OFDM) signal, the channels of at least some of the sub-carriers are likely to be orthogonal.

MIMO systems utilize multiple antennas at both the transmitter and receiver to improve communication performance. MIMO is one of several forms of smart antenna technology. Note that the terms input and output refer to the radio channel (represented by a channel matrix H) carrying the signal, not to the devices having antennas.

MIMO technology has attracted attention in wireless communications, because it offers significant increases in data throughput and link range without additional bandwidth or increased transmit power. It achieves this by spreading the same total transmit power over the antennas to achieve an array gain that improves the spectral efficiency (more bits per second per hertz of bandwidth) or to achieve a diversity gain that improves the link reliability (reduced fading). Because of these properties, MIMO is an important part of modern wireless communication standards such as IEEE 802.11n/AC (Wi-Fi), 4G, 3GPP Long Term Evolution, and Wi-MAX.

As stated, in MIMO systems, a transmitter sends multiple streams by multiple transmit antennas. The transmit streams go through a channel modeled as a matrix which consists of all $N_tN_r$ paths between the $N_t$ transmit antennas at the transmitter and $N_r$ receive antennas at the receiver. Then, for an OFDM system, the receiver obtains the received signal vectors by the multiple receive antennas and decodes the received signal vectors into the original information. A narrowband flat fading MIMO system is modeled as $$y = Hx + n$$

where y and x are the receive and transmit vectors, respectively, and H and n are the channel matrix and the noise vector, respectively.

Figure 2A:
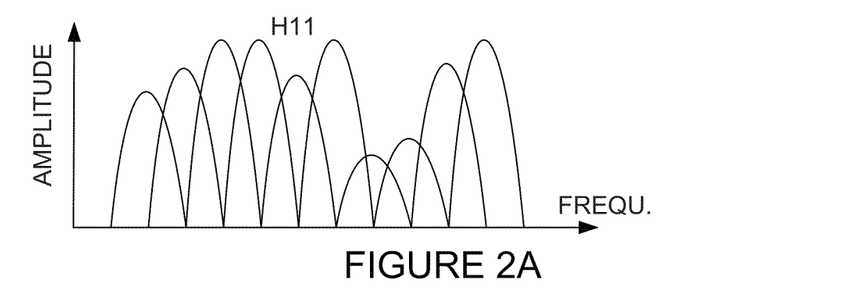
FIG. 2 shows an example of a multi-carrier signal.
Figure 2B:
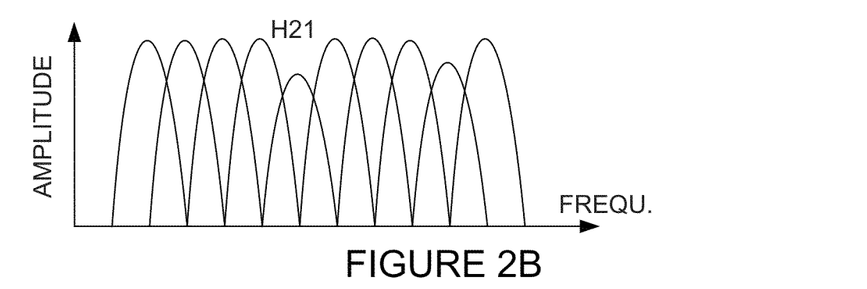
Figure 2C:
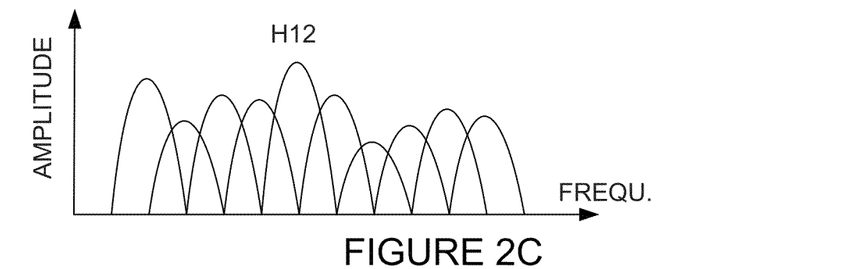
Figure 2D:
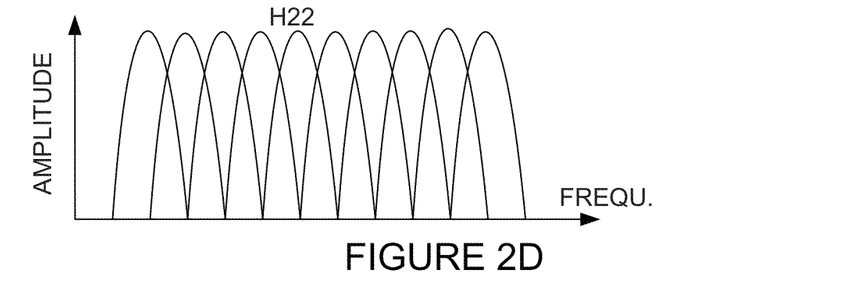

FIGS. 2A, 2B, 2C, 2D show examples of a frequency spectrum of several multi-carrier signals received over different channels. Multi-carrier signals are comprised of a set of sub-carrier signals. For an embodiment, multi-carrier signals are OFDM signals which include a set of orthogonal sub-carriers. Additionally, multi-carrier signals comprise a sequence of multi-carrier symbols wherein detection may be performed on a symbol by symbol basis. For OFDM signals, these symbols are referred to as OFDM symbols. What can be observed by these examples of multi-carrier signals is that the multi-carrier signals can vary depending upon the signal path of the multi-carrier signals. For example, the frequency spectrum of FIG. 2A represents a multi-carrier signal of the H11 path of the channel matrix H, the frequency spectrum of FIG. 2B represents a multi-carrier signal of the H21 path of the channel matrix H, the frequency spectrum of FIG. 2C represents a multi-carrier signal of the H12 path of the channel matrix H, and the frequency spectrum of FIG. 2D represents a multi-carrier signal of the H22 path of the channel matrix H. As can be observed, each spectrum has a different shape indicating that magnitudes of at least some sub-carriers are not correlated. Though not shown, phase of the channel responses also may not be correlated as well.

The primary advantage of multi-carrier signals over single carrier signals is its ability to cope with severe channel conditions (fading due to multipath) with simple equalization schemes. Equivalently, it is robust to inter-symbol interference caused by multipath propagation. Another advantage stems from its ease of implementation using the Fast Fourier Transform (FFT).

In a system (such as shown in FIG. 1), where MIMO signaling is overlaid on a multi-carrier system, such as in 802.11n, DVB-H etc, the equivalent reception can be viewed as parallel MIMO channels operating with flat-fading coefficients on each sub-carrier. For example, the received signal on each sub-carrier can be denoted by:

$$Y_k = H_k X_k + N_k$$

where, $Y_k$ the received vector, $H_k$ is the channel matrix, $X_k$ is the transmitted signal vector and $N_k$ is the noise vector for the $k^{th}$ sub-carrier. If $N_{Tx}$ and $N_{Rx}$ represent the number of transmit and receive antennas respectively, then $Y_k$ and $N_k$ are of dimension $N_{Rx} \times 1$, $H_k$ is of dimension $N_{Rx} \times N_{Tx}$, $X_k$ is of dimension $N_{Tx} \times 1$.

The transmitted signal vector on each sub-carrier may be detected using different approaches, the optimal being the Maximum likelihood (ML) scheme, which compares the received vector with all candidate transmitted vectors multiplied by the channel matrix. Though optimal, the complexity of the ML scheme grows exponentially with the number of transmit antennas and the modulation scheme. Further, in a multi-carrier system, the complexity using the ML scheme scales with the number of sub-carriers.

Low-complexity detection is possible using linear receivers such as zero-forcing (ZF) and minimum mean square error (MMSE) detectors which have a linear complexity. These detection schemes, however, are sub-optimal, since they do not efficiently collect the available diversity.

At least some of the described embodiments include a Hybrid detection scheme where different sub-carriers use different detection schemes. That is, for example, a selection is made on which sub-carriers use a linear detector and which sub-carriers use the optimal ML detector. It can be shown that such embodiments drastically reduce complexity with minimal loss of performance.

For at least some embodiments, the selection of sub-carriers is based on a number of parameters related to a channel between the transmitter and the receiver. For at least some embodiments, the effective SNR is used to make this selection. For an embodiment, the effective SNR, $\gamma_{eff}$ is computed as a function of the SNRs on the individual sub-carriers, i.e. $\gamma_{eff} = f(\gamma_{1,1}, \gamma_{2,1}, \ldots \gamma_{i,j} \ldots)$, where $\gamma_{i,j}$ the SNR for the $i^{th}$ sub-stream and the $j^{th}$ sub-carrier. One method of computing $\gamma_{i,j}$ involves computing SNRs for a zero-forcing solution, i.e.

$$\gamma_{i,j} = \frac{E_s}{N_0 \|w_{i,j}\|^2}$$

where, $W_i = H_i(H_i^H H_i)^{-1}$ and $w_{i,j}$ is the $j^{th}$ column vector of $W_i$, and where Es is an average symbol energy and N0 as the noise variance.

The effective SNR may be computed as a mean of the SNRs computed for the $i^{th}$ sub-stream and the $j^{th}$ sub-carrier, i.e.

$$\gamma_{\it{eff}} = \frac{1}{N_{Rx} N_{sc}} \sum_{i=1}^{N_{Rx}} \sum_{j=0}^{N_{sc}-1} \gamma_{i,j}$$

Alternatively, the effective SNR may be computed as a geometric mean instead of an arithmetic mean.

In addition to the factors like SNR on each sub-carrier, the performance of the linear detector depends on correlation or alternatively the orthogonality among the vectors of the channel matrices and the probability distribution function of the SNRs on the sub-carriers in the frequency domain. The probability distribution function of the SNRs depends on the channel power delay profile. Thus, for example, the selection metric could be a combination of a measure of the correlation between the various channel elements and a measure of the channel power delay profile.

One metric of correlation or orthogonality of a channel matrix, H is given by $$\frac{\det(H^H H)}{\prod_{i=1}^{N_{RX}} \|h_i\|^2},$$

where det( ) represents the determinant of the matrix and $h_i$ is the $i^{th}$ column of the matrix, H. If H is singular, then the above metric is 0 and if the columns of H are completely orthogonal, the above metric equals 1. In general the value of the metric lies between 0 and 1. Therefore, a threshold can be selected between 0 and 1 (and possibly adapted). For sub-carriers with orthogonality less than this threshold, ML decoding may be used and sub-carriers with orthogonality greater than this threshold, other detection techniques such as Zero Forcing or MMSE (sub-optimal) may be used.

Once, the selection metric is computed, for e.g. the effective SNR, the sub-carriers can be grouped into two groups, one that has greater SNR than the effective SNR and one group whose SNR is less than the effective SNR. Those groups that have SNR more than the effective SNR could use a low complexity Zero-forcing or MMSE detector and those that have SNR less than the effective SNR could use an optimal ML scheme or a near-optimal scheme.

The net SNR per sub-carrier in general could be some function of the SNRs computed per stream for that sub-carrier and not necessarily the mean, as mentioned above. For example, the ratio (order) of the SNRs per stream for a sub-carrier could also be used to determine which detection scheme could be used. If the ratio of the larger SNR to the smaller SNR is very large (even though the mean is greater than the effective SNR), then it is likely that a low-complexity receiver could cause a performance degradation and hence the ML scheme would have to be used.

For instance, if there are two streams, if SNR1 (i.e. SNR from stream 1) for a particular sub-carrier is much greater than effective SNR while SNR2 is lower than effective SNR, a detection technique may be chosen. Conversely, if both SNRs are above effective SNR, a sub-optimal detection technique may be chosen.

In most physical layer standards, training symbols are transmitted and these could be used to estimate the Channel and hence the selection metric can be easily computed.

The above proposed scheme can be improved when using the properties of the de-interleaver structure if, for example, a Bit-Interleaved Coded modulation (BICM) is used. A-priori knowledge of de-interleaver patterns allows for making better decisions on lowering the complexity further without sacrificing the performance. For example, a Viterbi decoder is known to be more sensitive to a burst of errors than randomly distributed errors. Thus, for a received packet at specific average SNR, the de-interleaver pattern may be such that, the soft decisions (i.e. log likelihood ratios) corresponding to sub-carriers with poor SNRs occur next to the sub-carriers with high SNRs. In this condition, even the poor SNR sub-carriers could potentially be detected using a Linear detector, such as a Zero-Forcing or MMSE receiver, thus, reducing the complexity of the Hybrid detection scheme even further. The SNR on each sub-carrier can be used to estimate the confidence level of the soft output information or the Log-Likelihood ratios. Sub-carriers with SNRs higher than the effective SNR would yield better confidence levels and better probability of bit-errors. For example, in AWGN channel at sufficiently high SNR operating point, the probability of an error event can be approximated by the equation given below.

$$PER \sim N(d_{\it{free}}) Q\left(\sqrt{d_{\it{free}}^2 * SNR}\right)$$

Where, $N(d_{\it{free}})$ is the number of code words at free distance $d_{\it{free}}$ of the convolutional code used and SNR is the average signal to noise ration in the channel. This equation can be slightly modified for frequency selective channels in the context of MIMO-OFDM systems as below.

$$PER \sim \sum_{i=0}^{d_{\it{free}}-1} Q\left(\Sigma \sqrt{SNR_{ij}}\right)$$

Where, $SNR_{ij}$, the effective SNR of $j^{th}$ sub-carrier corresponding to the $i^{th}$ codeword which is $d_{\it{free}}$ away from the transmitted codeword. Note that, this calculation is performed at the input of the Viterbi decoder, hence any operations such as de-interleaving and stream de-parsing have to be completed before applying the equation above. Also, note that, the above equation applies under the assumption that the operating average SNR point is such that, an error event comprises of decoding only the nearest codewords to the transmitted codeword, which are $d_{\it{free}}$ away from the transmitted codeword. Otherwise, more summands need to be included for other codewords The probability of bit error can further be determined from the PER as below;

$$p_b = b_{d_{\it{free}_{av}}} PER$$

Where $$b_{d_{\it{free}_{av}}}$$

is the average number of information bits associated with codewords at $d_{\it{free}}$ distance.

Figure 3:
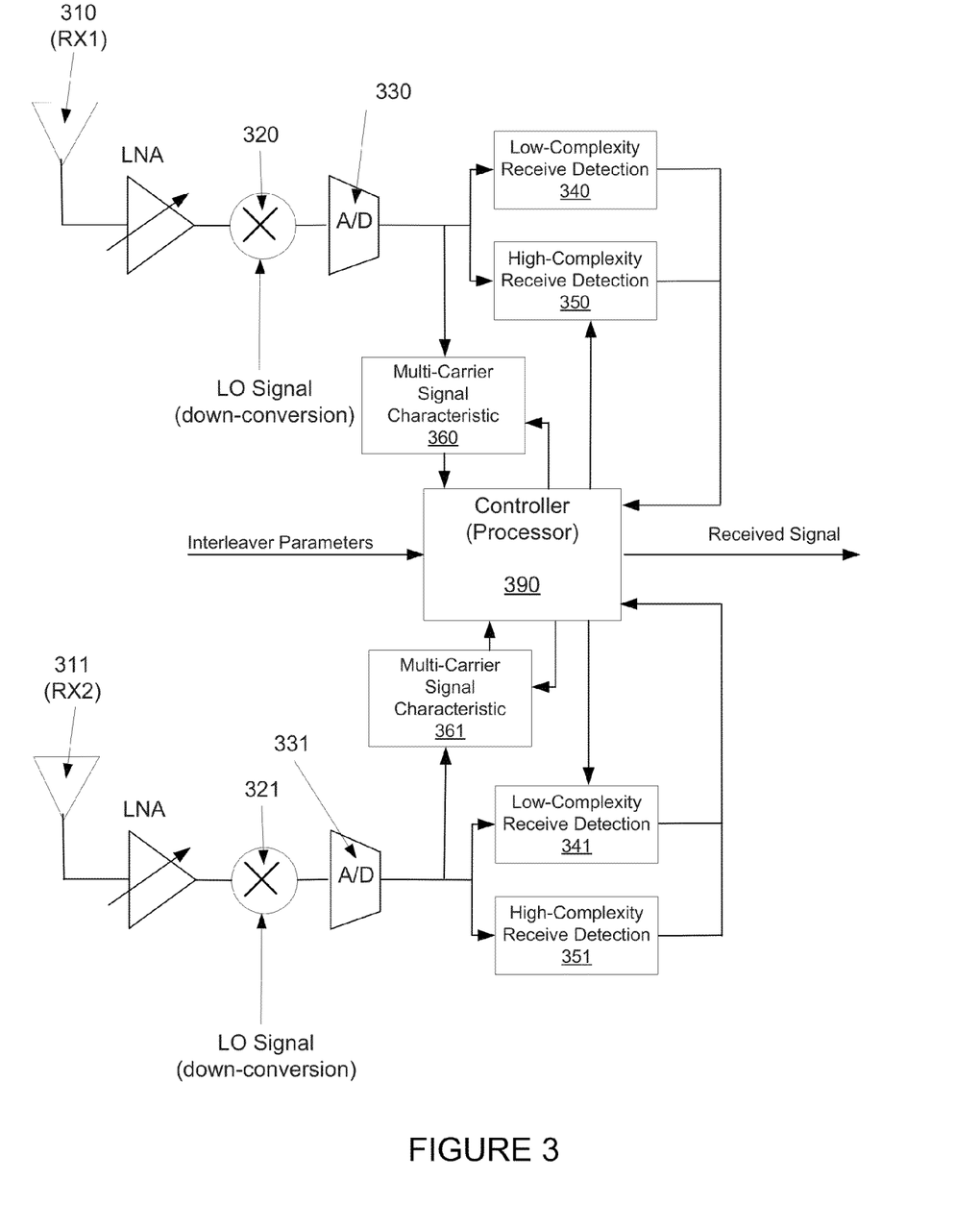
FIG. 3 shows a receiver that has multiple receiver chains and selects a receive detection technique for each sub-carrier of received multi-carriers based on a characteristic of each of the sub-carriers, according to an embodiment.

FIG. 3 shows a receiver that has multiple receiver chains and selects a receive detection technique for each sub-carrier of received multi-carriers based on a characteristic of each of the sub-carriers, according to an embodiment. It is to be understood that the representations of FIG. 3 provide a figurative depiction rather than a literal depiction of the functionality of the receiver. Clearly, alternate block diagrams can provide equivalent receiver functionality.

Functionally, a first receiver chain receives a multi-carrier signal through a first antenna (RX1) 310. The received multi-carrier signal is frequency down-converted (320) to a baseband and sampled (330). A signal characteristic of each sub-carrier of the multi-carrier signal is determined (360). Based on the determined characteristic, a controller 390 selects either a low-complexity receive detection 340 or high-complexity detection 350 for each of the sub-carriers. The controller 390 is responsive to interleaver parameters.

By utilizing the high-complexity receiver detection only on sub-carrier that need the high-complexity receiver detection, and using a low-complexity receiver detection for other sub-carriers, the resources required to receive detect the received multi-carrier signal can be reduced or minimized. This reduction is the use of processing resources allows the processing resources to be more effectively and usefully used.

Other advantages provided by the described embodiments include reduction receiver detection latency. That is, by reducing the processing required to detect the received signal, the time required to detect the receive signal is typically less. In turn, this can reduce the round trip time (define). Further, improved throughput can be realized. The Acks can be sent back sooner, hence decrease in transmission delay. Processing is faster therefore ACKs come back sooner.

Another advantage of the above scheme is to re-use the selection metric in other receive algorithms. For example, the Common Phase Error (CPE) can be improved based on data from sub-carrier that are selected using the above mentioned selection metric.

A number of parameter estimation algorithms in OFDM are directly affected by SNR on each sub-carrier. The sub-carriers with lower SNR usually contribute to mis-estimates in the parameter of concern leading to reduced performance. The above mentioned selection metric can be used to select the sub-carriers that have a reasonably good SNR, hence improving the parameter estimation and thereby performance. As an example, the estimate of Common Phase Error (CPE) can be improved based on data from sub-carriers that are selected using the above selection metric.

Phase noise is a common RF impairment present in the received baseband signal. The narrowband phase noise can typically be estimated and cancelled in the baseband resulting in lower overall noise or improved EVM (Error Vector Magnitude) on the signal to be decoded. The aforementioned component of phase noise that can be cancelled is a common phase rotation that is present on all the sub-carriers of a received OFDM symbol. In order to estimate the phase rotation, the received data is equalized (based on the knowledge of the channel estimate) and an estimate of the transmitted symbol is made using a hard slicer. The angle between the equalized data and hard slicer output represents an estimate of the phase error. Since there are other impairments present such as thermal noise, the estimate of the phase error is noisy. However, since the noise is expected to be uncorrelated among the various sub-carriers, averaging the estimate across all the sub-carriers (since the CPE to be estimated is constant across sub-carriers) provides a more accurate estimate. The estimate can be further improved by ignoring sub-carriers whose SNR falls below a threshold (for example, those sub-carriers whose noise variance is greater than the signal power would actually degrade the estimate rather than enhance it).

In order to use received data on a sub-carrier in the estimation of the CPE, the data must be decoded to estimate the transmitted symbol on that sub-carrier. Based on the estimated channel for the sub-carrier and the transmitted symbol estimate, the expected received data for that sub-carrier may be computed. The difference in angle between the actual received data for that sub-carrier and this estimated data represents the phase error estimate based on this sub-carrier. The weighted average of this angle estimate across all used sub-carriers provides a more accurate estimate. Note that if there are other impairments such as I/Q imbalance, the corresponding impairment compensation may be applied to the estimated received data in order to obtain a more accurate estimate of the expected received data. If the estimated transmitted symbol is incorrect, then the estimated CPE will have a larger error. Additionally, the transmitted symbol estimate should be obtained with a relatively low latency as the estimation of CPE is just one step in the overall decoding process and if the latency of this step exceeds a threshold, then overall latency budget of the receiver to decode a packet may be exceeded.

Given the aforementioned constraints on accurate transmit symbol estimates with low latency, a subset of the sub-carriers may be chosen which can meet these constraints. The previously discussed effective SNR metric may be used to select the sub-carriers for this step of CPE estimation. Specifically, the low complexity and low latency decoding technique can be applied to the sub-carriers which exceed the effective SNR in order to estimate the transmitted symbols (i.e. transmitted symbol on each stream for a given sub-carrier). Using the transmitted symbols estimates for each stream on the chosen set of sub-carriers, the CPE may be estimated as previously described.

Once the CPE has been estimated for an OFDM symbol, all sub-carriers are de-rotated by this estimate. The decoding process can then proceed on the residual signal (that is, after CPE removal) with improved signal quality to allow determination of improved log likelihood ratios (i.e. better confidence levels).

It should be noted that after CPE removal, the SNR for each sub-carrier is improved. This improvement may result in sub-carriers that now have SNR higher than effective SNR (which had SNR lower than effective SNR prior to CPE removal). Thus, the selection of set of sub-carriers for the reduced complexity decoding may be reassessed allowing further reduction of decoding complexity, latency, and/or power consumption.

Several embodiments can be used to decide on decoding techniques with consideration of power consumption. Based on the hardware resources required by each decoding technique, a power consumption estimate for decoding of a sub-carrier can be derived for each decoding technique under consideration. For example, denote the power consumption for a high complexity decoding technique such as ML and a low complexity decoding technique such as MMSE as $P_H$ and $P_L$ respectively. If the $P_H \gg P_L$, then the high premium on power consumption may necessitate setting the threshold (e.g. effective SNR) very low for using the low complexity decoding technique thereby ensuring that few sub-carriers will use the high complexity technique resulting in a more reasonable total power consumption.

Alternatively, for another embodiment, a total power consumption constraint is allotted for the receiver detection. Based on the total power consumption constraint, the average number of sub-carriers that can use the high complexity decoding technique while still satisfying the total power consumption constraint can be estimated. Denote this quantity as $N_H$. The sub-carriers are sorted in terms of a desired characteristic such as SNR. The high complexity decoding technique is then applied to the $N_H$ sub-carriers that have the lowest SNR. This ensures that the total power consumption constraint is not exceeded.

Figure 4:
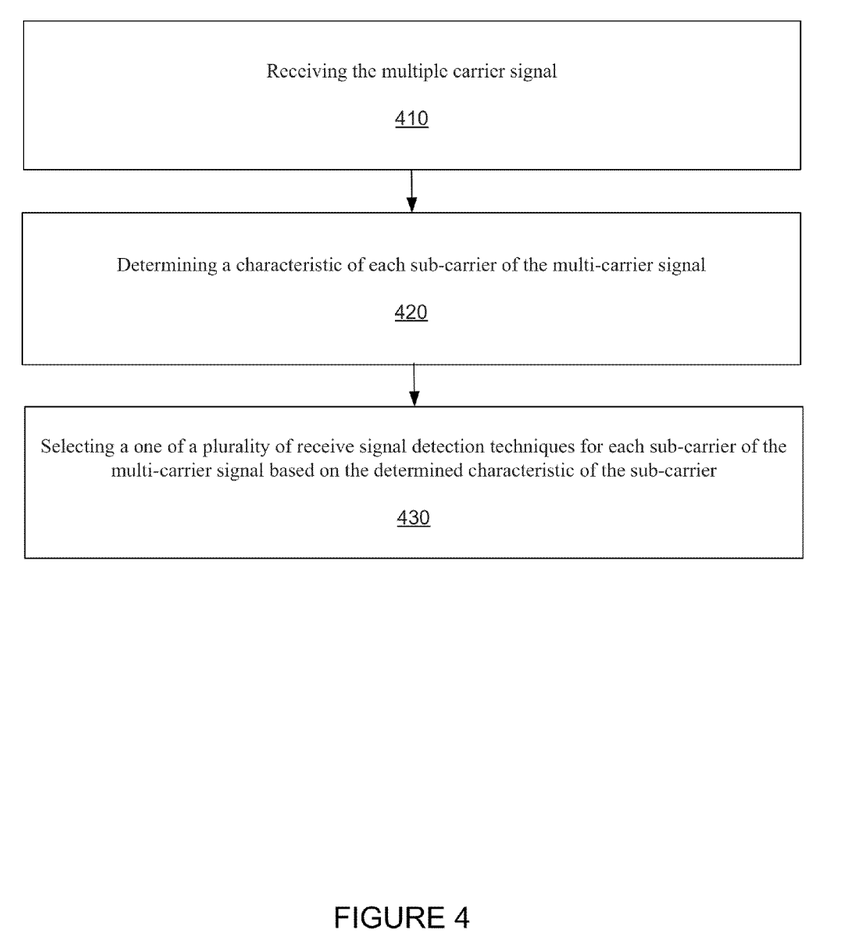
FIG. 4 is a flow chart that includes steps of a method of receive signal detection of a multi-carrier signal, according to an embodiment.

FIG. 4 is a flow chart that includes steps of a method of receive signal detection of a multi-carrier signal, according to an embodiment. A first step 410 includes receiving the multi-carrier signal. A second step 420 includes determining a characteristic of each sub-carrier of the multi-carrier signal. A third step 430 includes selecting a one of a plurality of receive signal detection techniques for each sub-carrier of the multi-carrier signal based on the determined characteristic of the sub-carrier.

As previously described, a plurality of multi-carrier signals can be received through multiple receive chains of a MIMO receiver. Additionally, a characteristic of each sub-carrier of each of the multi-carrier signals of each of the plurality of multi-carrier signals can be determined. A one of a plurality of receive signal detection techniques for each sub-carrier of each of the multi-carrier signals is selected based on the determined characteristic of the sub-carrier.

Various embodiments include the determination of one or more characteristics of the sub-carriers. For example, for one embodiment, the characteristic includes a function of a signal to noise ratio (SNR) of each sub-carrier. If the SNR or the function of SNR are below a threshold, then a high-complexity receive detection technique is used fort the sub-carrier. If the SNR or the function of SNR are above the threshold, then a low complexity receive detection technique is used for the sub-carrier. For an embodiment, the high-complexity receive detection technique includes a Maximum Likelihood detection.

For another embodiment, a channel matrix of the multiple receiver chains is estimated, and determining the characteristic for each sub-carrier includes determining an orthogonality of channel elements of the channel matrix that corresponds with the sub-carrier.

If the orthogonality of channel elements of the channel matrix is below a threshold, then a high-complexity receive detection technique is used for the sub-carrier. If the orthogonality of channel elements of the channel matrix is above the threshold, then a low complexity receive detection technique is used for the sub-carrier. For an embodiment, the high-complexity receive detection technique includes a Maximum Likelihood detection.

An embodiment further includes constructing de-interleaved sequences of function of SNRs corresponding to each sub-carrier and identifying sequences of function of SNRs having levels below a threshold. For an embodiment, a Maximum Likelihood detection technique is used for sub-carriers having corresponding de-interleaved sequences of function of SNRs having levels below the threshold. For a specific embodiment, a Maximum Likelihood detection technique is used for sub-carriers whose corresponding de-interleaved sequences of function of SNRs increase average PER above a threshold. It is to be understood, that for embodiments, encoding/interleaving are transmit characteristics of multi-carrier signal that are known a priori by the receiver.

An embodiment includes selecting the one of a plurality of receive signal detection techniques for each sub-carrier of the multi-carrier signal based on the determined characteristic of the sub-carrier, and based on receiver hardware resources available for receive signal detection.

Alternatively, or additionally, and embodiment includes using a high complexity receive signal detection technique for each sub-carrier having an SNR below a threshold, and a low complexity receive signal detection technique for each sub-carrier having an SNR above the threshold, wherein the threshold is selected based on receiver hardware resources available. Alternatively, or additionally, and embodiment includes using a high complexity receive signal detection technique for each sub-carrier having SNR below a threshold, and a low complexity receive signal detection technique for each sub-carrier having an SNR above the threshold, wherein the threshold is selected based on a desired latency of the receive signal detection.

An embodiment includes selecting a low-complexity receive signal detection technique for each sub-carrier of the multi-carrier signal that has a signal quality greater than a threshold, decoding symbols of sub-carriers of each sub-carrier that has been selected to utilize the low-complexity receive signal detection technique, estimating a common phase error of each received multi-carrier symbol using sub-carriers of the multi-carrier symbol that have been selected to utilize the low-complexity receive signal detection technique, and adjusting a phase of each received multi-carrier symbol based on the estimated common phase error. An embodiment additionally includes re-determining a characteristic of each sub-carrier of each phase adjusted received multi-carrier symbol, and re-selecting a one of a plurality of receive signal detection techniques for each sub-carrier of each phase adjusted received multi-carrier symbol based on the determined characteristic of the sub-carrier.

An embodiment includes selecting the one of a plurality of receive signal detection techniques for each sub-carrier of the multi-carrier signal based on the determined characteristic of the sub-carrier, and based on receiver power consumption. Alternatively, or additionally, an embodiment includes selecting the one of a plurality of receive signal detection techniques for each sub-carrier of the multi-carrier signals based on based on power consumption constraints.

For an embodiment, the characteristic of each sub-carrier of the multi-carrier signals is determined as frequently as once per packet based on channel coherence times.

Figure 5:
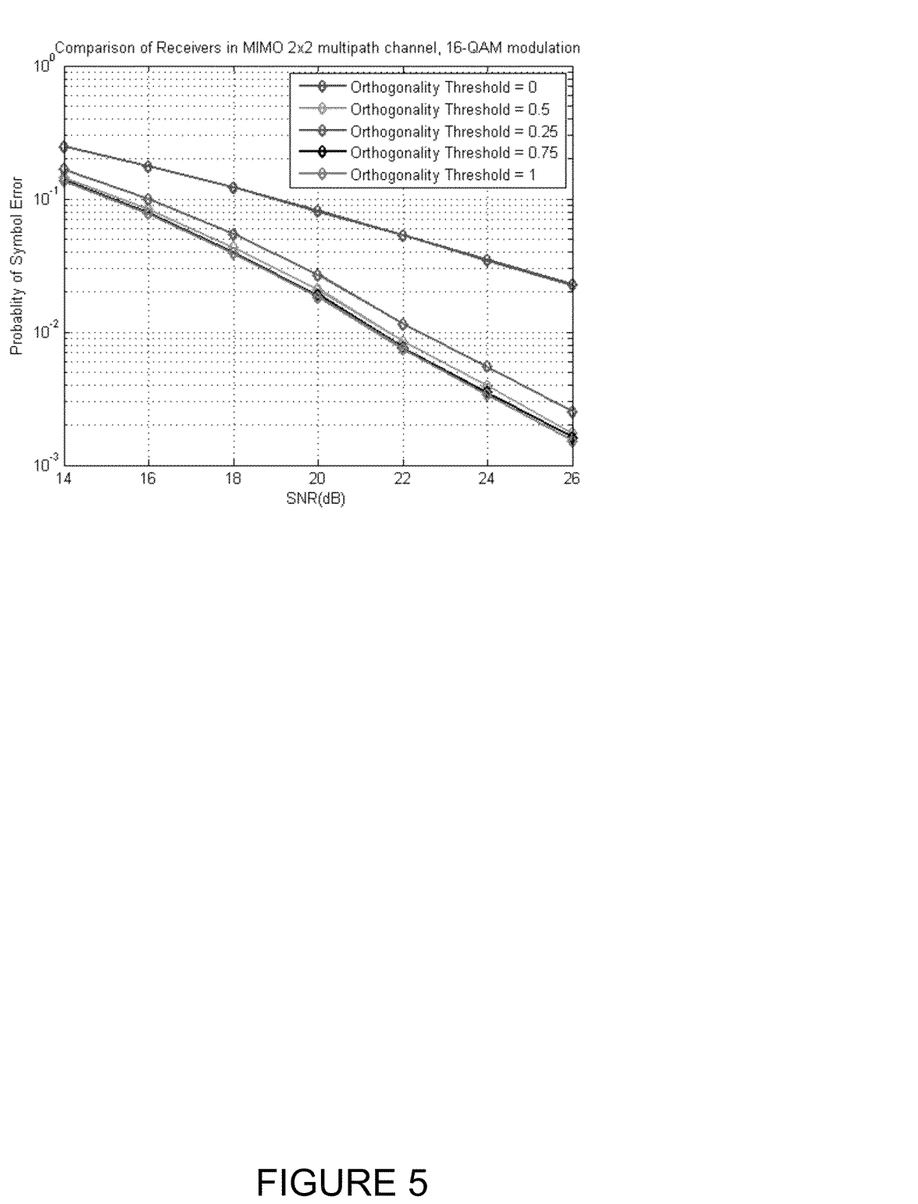
FIG. 5 and FIG. 6 are plots that show comparison of performance for receiver detection of a MIMO-OFDM signal using a single complex receiver technique, and using the hybrid receive detection techniques of the described embodiments.

FIG. 5 shows the performance of 16-QAM as a function of the orthogonality threshold. If the channel orthogonality metric is greater than the threshold, low complexity Zero-forcing receiver is employed else the high complexity ML detection scheme is used. As an example, it was seen that when the orthogonality threshold was set to 0.5, 40% of the sub-carriers used Zero-forcing scheme while 60% used ML detection.

The computation or determination of the sub-carrier characteristic itself requires some hardware resources. Therefore, the receiver may attempt to reduce this complexity by minimizing the frequency of computation of these characteristics. In a very dynamic environment where the wireless channel is varying rapidly, the sub-carrier characteristics may vary on an OFDM symbol by symbol basis. In this scenario, the characteristics and hence the decision of detection techniques to be applied are re-computed every symbol. If the channel does not vary appreciably over the course of a packet, then the characteristics may be computed just once per packet (typically during the preamble). If the channel is relatively constant across packets, then the sub-carrier characteristics may be computed once per time interval (which might span several packets).

For an embodiment, the channel coherence time is used as a measure to track the time varying nature of the channel and this measure is used to determine which of the aforementioned time varying traits are exhibited by the wireless channel. Note that the wireless channel refers not only to the wireless channel corresponding to the signal of interest but also that of potential interferers. Additionally, for MIMO systems, channel coherence time also must measure the correlation among the multiple transmit and receive chains as well.

Another embodiment includes constructing de-interleaved sequences of a function of the SNRs corresponding to each sub-carrier using the properties of the Interleaver and identifying those having levels below a threshold. The function of the SNRs approximates the average confidence levels for each bit transmitted in each sub-carrier. Identifying sub-carriers above a threshold may include determining sequences of low confidence levels that would result in a high probability of bit error. This determination is based on the knowledge of the code as well as the characteristics of the noise. For the identified sub-carriers, a high complexity receive detection scheme is used and a low-complexity detection scheme is used for the ones that have levels above a threshold. For an embodiment, the high-complexity receive detection technique includes a Maximum Likelihood detection.

An embodiment includes selecting the one of a plurality of receive signal detection techniques for each sub-carrier of the multi-carrier signal based on the determined characteristic of the sub-carrier, and based on receiver hardware resources available for receive signal detection. More specifically, for an embodiment, a high complexity receive signal detection technique is used for each sub-carrier having an SNR below a threshold, and a low complexity receive signal detection technique is used for each sub-carrier having an SNR above the threshold, wherein the threshold is selected based on the hardware resources available. Further, for an embodiment the threshold is additionally selected based on a desire latency of the receive signal detection.

Figure 6:
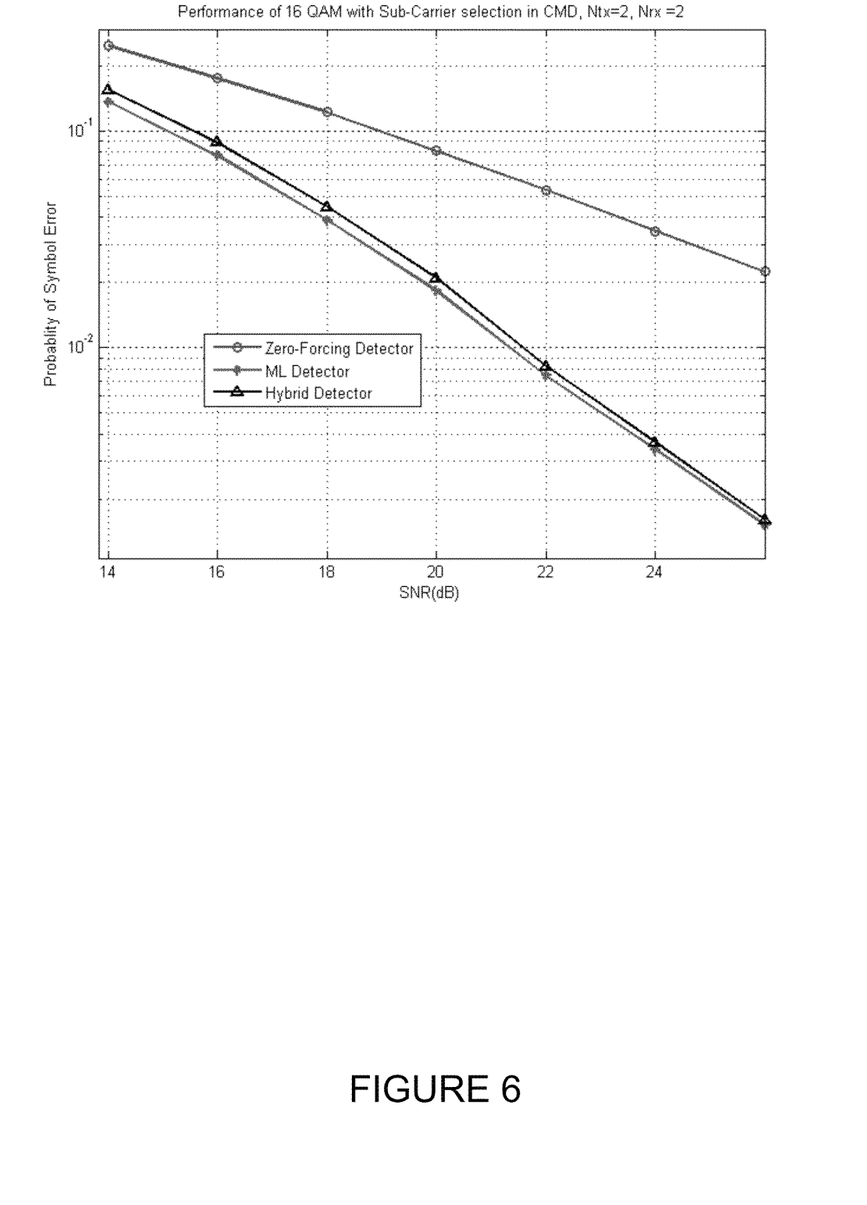

FIG. 6 is a plot that shows a comparison of performance for receiver detection of a MIMO-OFDM signal using a single complex receiver technique, and using the hybrid receive detection techniques of the described embodiments. As the plot clearly shows, the benefits of performance provided by a pure ML receive detection technique is substantially retained with the describe hybrid receive detection techniques. However, as described, the hybrid receive techniques require substantially less processing.

An interesting observation of FIG. 6 is that while using the Hybrid receive detection scheme, only 40% of the total sub-carriers used the high complexity ML scheme, while 60% used the low-complexity Zero-forcing scheme in a CMD channel. This almost halves the overall receiver complexity.

Figure 7:
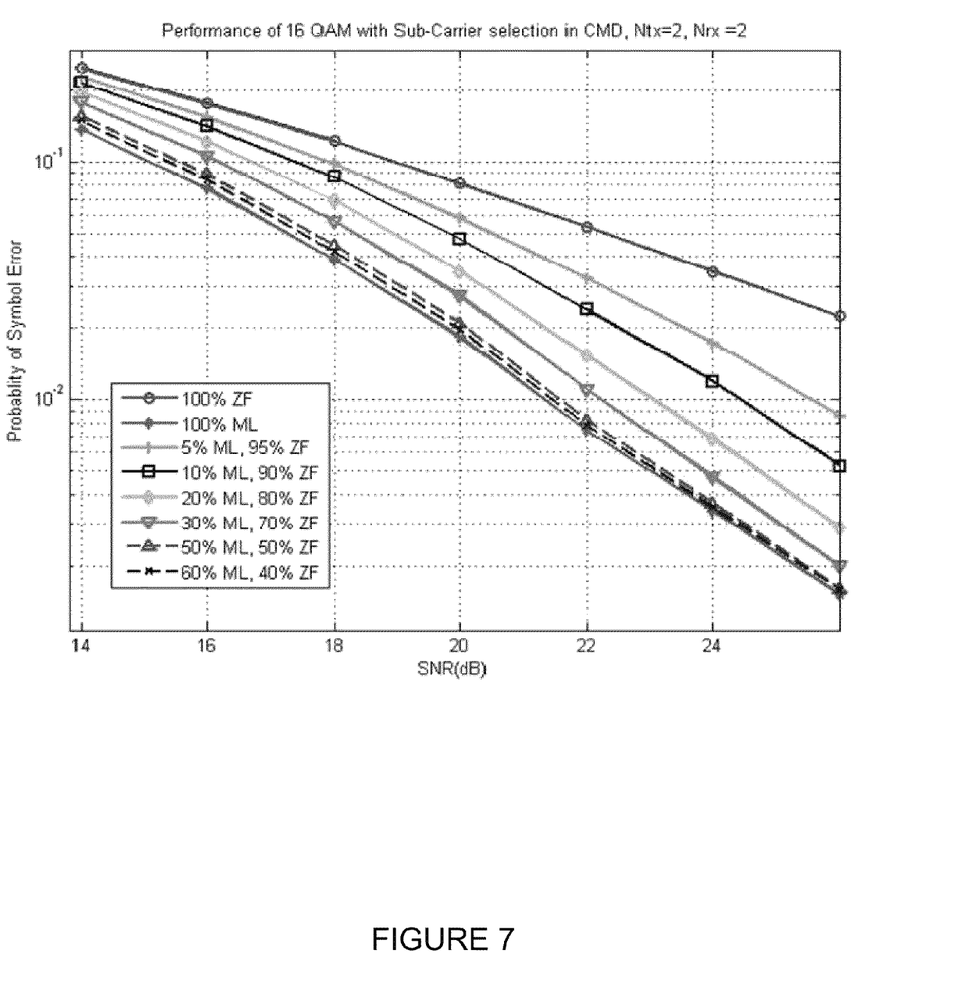
FIG. 7 is a plot that highlights the performance with different percentages of sub-carriers using ML and Zero-Forcing detection schemes.

FIG. 7 is a plot that highlights the performance with different percentages of sub-carriers using ML and Zero-Forcing. As shown, the probability of symbol error is lower as the percentage of ML goes up. However, above a certain percentage of sub-carriers being decoded, the improvement in the probability of symbol error goes down greatly above a certain percentage of sub-carriers being decoding using ML.

Some wireless systems include transmitters (first transceivers) and receivers (second transceivers) that communicate between each other over similar or common transmission channels. That is, for example, channel matrices are similar for communications going in either direction between the first transceivers and the second transceivers. In these situations, reciprocity of the channel matrices in either transmission direction can be assumed. Accordingly, an embodiment includes a wireless system. The wireless system includes a transmitter. The transmitter includes at least one transmit chain that transmits at least one multi-carrier signal. The transmitter further includes a transmit processor, wherein the transmit processor is operative to estimate a channel matrix of a transmission channel between the at least one transmitter chain and a plurality of receive chains. The wireless system further includes a receiver. The receiver includes the plurality of receive chains that are operable to receive the at least one multi-carrier signal and the channel matrix from the transmitter. The receiver further includes a receiver processor that is configured to determine a characteristic of each sub-carrier of the at least one multi-carrier signal wherein the determined characteristic for each sub-carrier comprises an orthogonality of channel elements of the channel matrix that correspond with the sub-carrier, and select a one of a plurality of receive signal detection techniques for each sub-carrier of the at least one multi-carrier signal based on the determined characteristic of the sub-carrier.

Although specific embodiments have been described and illustrated, the embodiments are not to be limited to the specific forms or arrangements of parts so described and illustrated. The described embodiments are to only be limited by the claims.

What is claimed:

1. A receiver, comprising:
a plurality of receive chains operable to receive at least one multi-carrier signal;
a processor, the processor configured to:
determine a characteristic of each sub-carrier of the at least one multi-carrier signal;
estimate a channel matrix of the plurality of receive chains, wherein the determined characteristic for each sub-carrier comprises an orthogonality of channel elements of the channel matrix that correspond with the sub-carrier; and
select a one of a plurality of receive signal detection techniques for each sub-carrier of the at least one multi-carrier signal based on the determined characteristic of the sub-carrier.

2. The receiver of claim 1, wherein a Maximum Likelihood detection technique is the one of the plurality of receive signal detection techniques selected for each sub-carrier that has the orthogonality of channel elements of the channel matrix of the sub-carrier below a threshold.

3. The receiver of claim 1, further comprising the processor operative to select the one of a plurality of receive signal detection techniques for each sub-carrier of the at least one multi-carrier signal based on the determined characteristic of the sub-carrier, and based on receiver hardware resources available for receive signal detection.

4. The receiver of claim 1, further comprising the processor operative to select the one of a plurality of receive signal detection techniques for each sub-carrier of the multi-carrier signal based on the determined characteristic of the sub-carrier, and based on receiver power consumption.

5. The method of claim 4, further comprising selecting the one of a plurality of receive signal detection techniques for each sub-carrier of the at least one multi-carrier signal based on based on power consumption constraints.

6. A receiver, comprising:
a plurality of receive chains operable to receive a plurality of multi-carrier signal streams;
a processor, the processor configured to:
compute a net SNR per subcarrier as a function of SNRs of each multi-carrier signal stream of the subcarrier;
select a high complexity receive signal detection technique for each sub-carrier having a net SNR below a threshold, and select a low complexity receive signal detection technique for each sub-carrier having a net SNR above the threshold.

7. The receiver of claim 6, wherein the threshold is adaptively selected based on hardware resources available.

8. The receiver of claim 6, further comprising the processor operative to select the one of a plurality of receive signal detection techniques for each sub-carrier of the at least one multi-carrier signal based on the determined characteristic of the sub-carrier, and based on receiver hardware resources available for receive signal detection.

9. A receiver, comprising:
- a plurality of receive chains operable to receive at least one multi-carrier signal;
- a processor, the processor configured to:
  - determine a characteristic of each sub-carrier of the at least one multi-carrier signal; and
  - select a one of a plurality of receive signal detection techniques for each sub-carrier of the at least one multi-carrier signal based on the determined characteristic of the sub-carrier;
  - construct de-interleaved sequences of a function of SNRs corresponding to each sub-carrier based on knowledge of encoding and interleaving of the at least one multi-carrier signal.

10. The receiver of claim 9, further comprising using a Maximum Likelihood detection technique for each sub-carrier having a function of de-interleaved sequence of SNRs below a threshold.

11. A receiver, comprising:
- a plurality of receive chains operable to receive at least one multi-carrier signal;
- a processor, the processor configured to:
  - determine a characteristic of each sub-carrier of the at least one multi-carrier signal; and
  - select a one of a plurality of receive signal detection techniques for each sub-carrier of the at least one multi-carrier signal based on the determined characteristic of the sub-carrier;
- wherein a high complexity receive signal detection technique is selected for each sub-carrier having an SNR below a threshold, and a low complexity receive signal detection technique is selected for each sub-carrier having an SNR above the threshold, wherein the threshold is additionally selected based on a desired latency of receive signal detection.

12. A receiver, comprising:
- a plurality of receive chains operable to receive at least one multi-carrier signal;
- a processor, the processor configured to:
  - determine a characteristic of each sub-carrier of the at least one multi-carrier signal; and
  - select a one of a plurality of receive signal detection techniques for each sub-carrier of the at least one multi-carrier signal based on the determined characteristic of the sub-carrier;
- wherein the at least one multi-carrier signal comprises a sequence of received multi-carrier symbols, and further comprising the processor operative to:
- select a low-complexity receive signal detection technique for each sub-carrier of the multi-carrier signal that has a signal quality greater than a threshold;
- decode symbols of sub-carriers of each sub-carrier that has been selected to utilize the low-complexity receive signal detection technique;
- estimate a common phase error of each received multi-carrier symbol using sub-carriers of the multi-carrier symbol that have selected to utilize the low-complexity receive signal detection technique; and
- adjust a phase of each received multi-carrier symbol based on the estimated common phase error.

13. The receiver of claim 12, further comprising
- re-determining a characteristic of each sub-carrier of each phase adjusted received multi-carrier symbol; and
- re-selecting a one of a plurality of receive signal detection techniques for each sub-carrier of each phase adjusted received multi-carrier symbol based on the determined characteristic of the sub-carrier.

14. A receiver, comprising:
- a plurality of receive chains operable to receive at least one multi-carrier signal;
- a processor, the processor configured to:
  - determine a characteristic of each sub-carrier of the at least one multi-carrier signal; and
  - select a one of a plurality of receive signal detection techniques for each sub-carrier of the at least one multi-carrier signal based on the determined characteristic of the sub-carrier;
- wherein the characteristic of each sub-carrier of the multi-carrier signals is determined as frequently as once per packet based on channel coherence times.

15. A method of receive signal detection of a multi-carrier signal, comprising:
- receiving the multi-carrier signal;
- determining a characteristic of each sub-carrier of the multi-carrier signal; and
- selecting a one of a plurality of receive signal detection techniques for each sub-carrier of the multi-carrier signal based on the determined characteristic of the sub-carrier;
- estimating a channel matrix of the multiple receiver chains, wherein the characteristic determined for each sub-carrier comprises an orthogonality of channel elements of the channel matrix that corresponds with the sub-carrier.

16. The method of claim 15, further comprising receiving a plurality of multi-carrier signals through multiple receiver chains, and further comprising
- determining a characteristic of each sub-carrier of each of the multi-carrier signals; and
- selecting a one of a plurality of receive signal detection techniques for each sub-carrier of each of the multi-carrier signals based on the determined characteristic of the sub-carrier.

17. The method of claim 15, wherein a Maximum Likelihood detection technique is selected for each sub-carriers that has the orthogonality of channel elements of the channel matrix of the sub-carrier below a threshold.

18. A method of receive signal detection of a multi-carrier signal, comprising:
- receiving the multi-carrier signal;
- determining a characteristic of each sub-carrier of the multi-carrier signal; and
- selecting a one of a plurality of receive signal detection techniques for each sub-carrier of the multi-carrier signal based on the determined characteristic of the sub-carrier;
- constructing de-interleaved sequences of function of SNRs corresponding to each sub-carrier and identifying sequences of function of SNRs having levels below a threshold.

19. The method of claim 15, wherein a high complexity receive signal detection technique is used for each sub-carrier having an SNR below a threshold, and a low complexity receive signal detection technique is used for each sub-carrier having an SNR above the threshold, wherein the threshold is selected based on receiver hardware resources available.

20. The method of claim 15, further comprising selecting the one of a plurality of receive signal detection techniques for each sub-carrier of the multi-carrier signal based on the determined characteristic of the sub-carrier, and based on receiver hardware resources available for receive signal detection.

21. The method of claim 18, further comprising using a Maximum Likelihood detection technique for sub-carriers having corresponding de-interleaved sequences of function of SNRs having levels below the threshold.

22. The method of claim 18, further comprising using a Maximum Likelihood detection technique for sub-carriers whose corresponding de-interleaved sequences of function of SNRs increase average PER above a threshold.

23. A method of receive signal detection of a multi-carrier signal, comprising:
  receiving the multi-carrier signal;
  determining a characteristic of each sub-carrier of the multi-carrier signal; and
  selecting a one of a plurality of receive signal detection techniques for each sub-carrier of the multi-carrier signal based on the determined characteristic of the sub-carrier;
  wherein a high complexity receive signal detection technique is used for each sub-carrier having an SNR below a threshold, and a low complexity receive signal detection technique is used for each sub-carrier having an SNR above the threshold, wherein the threshold is selected based on a desired latency of the receive signal detection.

24. A method of receive signal detection of a multi-carrier signal, comprising:
  receiving the multi-carrier signal;
  determining a characteristic of each sub-carrier of the multi-carrier signal; and
  selecting a one of a plurality of receive signal detection techniques for each sub-carrier of the multi-carrier signal based on the determined characteristic of the sub-carrier;
  selecting a low-complexity receive signal detection technique for each sub-carrier of the multi-carrier signal that has a signal quality greater than a threshold;
  decoding symbols of sub-carriers of each sub-carrier that has been selected to utilize the low-complexity receive signal detection technique;
  estimating a common phase error of each received multi-carrier symbol using sub-carriers of the multi-carrier symbol that have been selected to utilize the low-complexity receive signal detection technique; and
  adjusting a phase of each received multi-carrier symbol based on the estimated common phase error.

25. A wireless system, comprising:
  a transmitter comprising;
    at least one transmit chain, the at least one transmit chain transmitting at least one multi-carrier signal;
    a transmit processor, the transmit processor operative to:
      estimate a channel matrix of a transmission channel between the at the least one transmitter chain and a plurality of receive chains;
  a receiver, comprising:
    the plurality of receive chains operable to receive the at least one multi-carrier signal and the channel matrix from the transmitter;
    a receiver processor, the receiver processor configured to:
      determine a characteristic of each sub-carrier of the at least one multi-carrier signal wherein the determined characteristic for each sub-carrier comprises an orthogonality of channel elements of the channel matrix that correspond with the sub-carrier;
      estimate a channel matrix of the multiple receiver chains, wherein the determined characteristic for each sub-carrier comprises an orthogonality of channel elements of the channel matrix that correspond with the sub-carrier; and
      select a one of a plurality of receive signal detection techniques for each sub-carrier of the at least one multi-carrier signal based on the determined characteristic of the sub-carrier.

* * * * *